United States Patent [19]

Garske et al.

[11] Patent Number: 4,990,206

[45] Date of Patent: Feb. 5, 1991

[54] METHOD OF WELDING TUBE ENDS ONTO A TUBE SHEET

[75] Inventors: Friedrich Garske; Bernd Kraft, both of Wuppertal, Fed. Rep. of Germany

[73] Assignee: Akzo N.V., Netherlands

[21] Appl. No.: 218,268

[22] Filed: Jul. 13, 1988

[30] Foreign Application Priority Data

Jul. 15, 1987 [DE] Fed. Rep. of Germany ....... 3723317

[51] Int. Cl.$^5$ ............................................. B29C 65/18
[52] U.S. Cl. .................................... 156/282; 156/293; 156/297; 156/311; 210/321.8; 210/321.89; 264/248
[58] Field of Search ...................... 156/293, 309.6, 196, 156/221, 282, 297, 303.1, 311; 210/321.79, 321.8, 321.81, 321.88, 321.89, 321.9; 264/248

[56] References Cited

U.S. PATENT DOCUMENTS

| | | | |
|---|---|---|---|
| 3,459,622 | 8/1969 | Fisher | 156/423 |
| 3,583,907 | 6/1971 | Borsanyi | 210/321.8 |
| 3,702,658 | 11/1972 | McNamara et al. | 210/321.8 |
| 3,841,938 | 10/1974 | Grosse-Holling et al. | 156/293 |
| 3,966,520 | 6/1976 | Fallenbeck et al. | 156/73.1 |
| 4,790,372 | 12/1988 | Gemeinhardt et al. | 156/309.6 |
| 4,800,019 | 1/1989 | Bikson et al | 210/321.8 |

FOREIGN PATENT DOCUMENTS

| | | |
|---|---|---|
| 1704261 | 4/1971 | Fed. Rep. of Germany . |
| 2603615 | 8/1977 | Fed. Rep. of Germany . |
| 3543283 | 6/1987 | Fed. Rep. of Germany . |
| 1225628 | 3/1971 | United Kingdom .................. 285/21 |

OTHER PUBLICATIONS

"A Guide to Ultrasonic Plastics Assembly", Branson Sonic Power Company Technical Brochure, 1973, pp. 1-9, 32-37, 42-44.
"Entwicklung vonWarmeaustauschern aus Polyoefin-Kunststoffen", 8/8/73, J. Hapke, H. Datene und W. Grosse-Holling.

Primary Examiner—Michael W. Ball
Assistant Examiner—Steven D. Maki
Attorney, Agent, or Firm—Oliff & Berridge

[57] ABSTRACT

A method of welding porous tube ends onto a tube sheet is disclosed, wherein tube ends projecting over the tube sheet are fused into a melt. Part of the melt is conducted to the outside in a radial direction, so that it lies on the end face of the tube sheet. Melt and tube sheet are then welded together. The tube end is preferably cooled from the inside by a metal pin is inserted into the tube end.

6 Claims, 7 Drawing Sheets

METHOD OF WELDING TUBE ENDS ONTO A TUBE SHEET

DESCRIPTION OF THE TECHNICAL FIELD

The invention relates to a method of welding tube ends of synthetic polymers onto a tube sheet of a synthetic polymer, in which the tube ends are inserted into holes in the tube sheet in such a way that they project slightly over the tube sheet, the tube ends are deformed at welding temperature and are then welded onto the tube sheet at its end face.

A method of this kind is known from HLH 24 (1973) No. 8, pages 248 to 253, especially 249/250, as the hot-punch welding method. This known method is used to make shell-and-tube heat exchangers from plastic material. Two tools are required to produce the weld between very thin-walled tubes and a thick tube sheet, the first tool being used to heat the area of the future weld and the second tool being used to make the actual weld. Both tools are specially shaped for their particular purpose. This known method is carried out first by bringing the projecting tube end to welding temperature through heat radiation, then deforming it with the second welding tool in such a way that the actual welding is carried out between the tube and the tube sheet on the end face of the tube sheet.

This known hot-punch welding method cannot be used if porous tubes must be welded onto a tube sheet. Porous tubes of this kind have a pore volume of at least 20% of the wall volume. The pore volume can amount up to 90% of the wall volume of the tubes. This kind of porous tubes are very difficult to weld, because the amount of solid material in the tube wall is small, causing the tubes to melt even if a small amount of heat is supplied. Moreover, when melting porous tube ends, the volume of the melt is reduced by the pore volume content compared to the volume of the porous tube walls. This will inevitably cause the tube material to flow, so that the use of the known hot-punch welding method will cause the tube material to flow inward into the tube, even at the start of the first heating.

Therefore, an object of the present invention is to provide a method of the type mentioned in the introduction or a hot-punch welding method by means of which porous tube ends made of synthetic polymers can be welded onto a tube sheet of synthetic polymers. In addition, the heat energy used for the welding must be employed as economically as possible.

BRIEF SUMMARY OF THE INVENTION

In one aspect, the present invention relates to a method for welding porous tube ends to a tube sheet, comprising:

inserting tube ends into the bores of a tube sheet so that said ends extend beyond a opposite surface of said tube sheet;

partially melting said tube ends so that a melt so formed is conducted radially outwardly to rest partially upon and in contact with an annular portion of said opposite surface of said tube sheet and partially remains in contact with unmelted portions of said tube ends;

heating said annular portion of said opposite surface of said tube sheet, thereby welding said tube end and said tube sheet together.

DETAILED DESCRIPTION OF THE PREFERRED EMBODIMENTS

Figure 1:
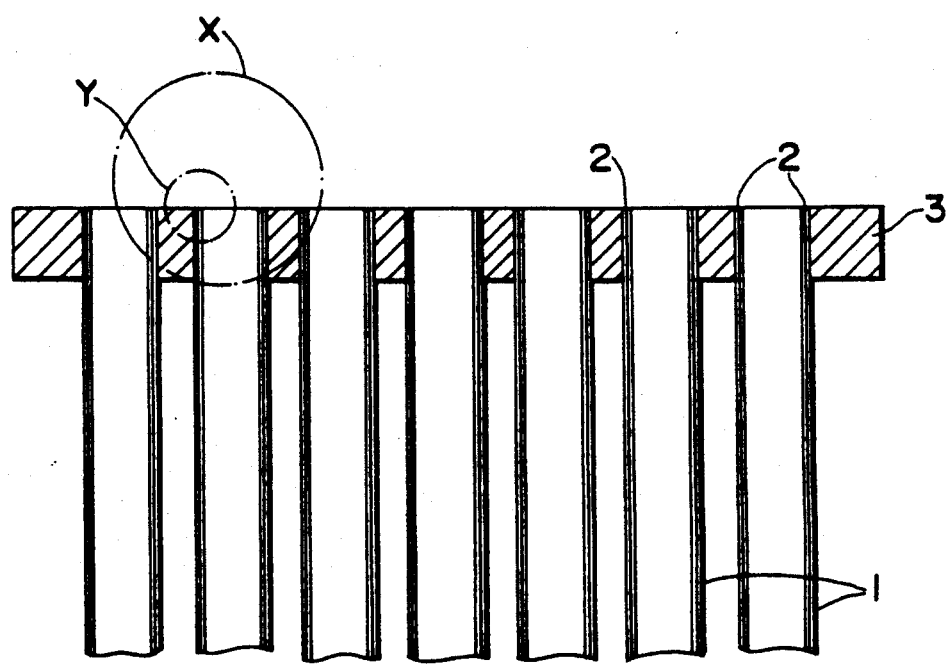
FIG. 1 is a schematic diagram, in cross section, of a microfilter made in accordance with the method of the invention.
Figure 2:
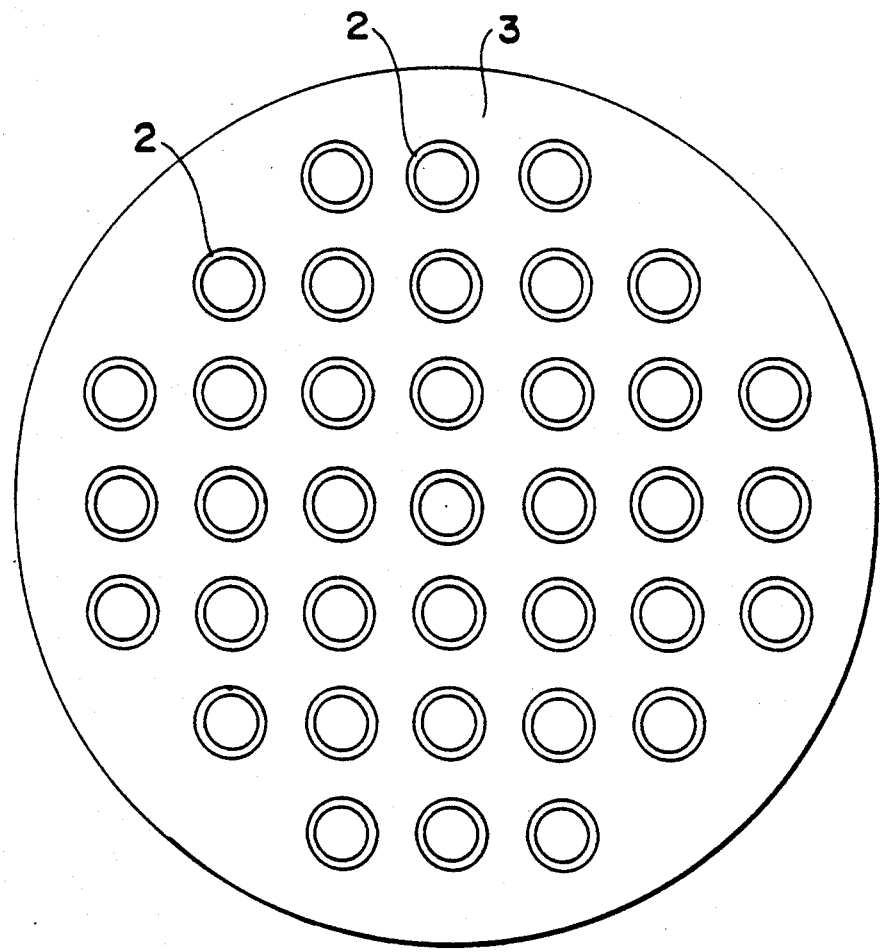
FIG. 2 is a top plan view of the microfilter in FIG. 1.

As summarized above, the present invention relates to a method of welding porous tube ends, first by melting only the tube ends into a melt, conducting the melt radially outward, causing the melt to rest partially on the end face of the tube sheet, and allowing it to remain partially attached to the porous end that has not yet melted, then, while ensuring that the tube end is kept in molten condition by annular heating of the tube sheet in the circumferential area in which the melt of the tube end rests on the tube sheet, welding tube end and tube sheet together.

The term "tubes" within the meaning of the invention includes all tubular bodies, as for example pipes, hoses, or hollow filaments. The cross-sectional shape of the tubes is not limited to circular cross sections; the tubes can also have elliptical or polygonal, for example triangular, quadrangular, quadratic, pentagonal, or other, cross sections. The thickness of the tube walls resulting from the tubes outer and inner cross sections can be made equal or different along the circumference of the tubes. The tubes' outside and inside cross sections can have the same or different cross-sectional shapes. For example, a tube can have an outside cross section that is polygonal and an inner cross section that is circular or elliptical. Also, the inside cross section of the tubes can have one or more continuous cavities. For example, a tube can have an outside cross section that is polygonal and an inner cross section which is circular or elliptical. Also, the inside cross section of the tubes can have one or more continuous cavities.

All synthetic polymers that can be thermowelded are suitable as materials for the tube ends and tube sheet. These polymers include primarily the thermoplastic polymers, as for example the fluoropolymers, polyethylenes, or polypropylenes. Advantageously, the tube material and tube sheet material have the same or nearly the same melting point or melting range. It is especially advantageous for the tube ends and tube sheet to be made of thermoplastic polymers belonging to the same kind of polymer by virtue of their basic structure.

The method incorporating the invention can be carried out by means of a specially shaped welding tool. The welding tool shall in any case not have a mandrel that extends into the tube end, since already because of heat radiation the tube end will be fused on the inside and will start flowing, so that the tube end can no longer be firmly attached to the tube sheet. Furthermore, the contact surface of the tool must be formed in such a way that most of the melt that has been melted from the tube end will be carried away directly to the outside, so that the melt is effectively prevented from flowing into the tube end. Only after a sufficient quantity of melt has been transferred to the end face of the tube end by means of the tool must the tool be allowed to act on the tube sheet as well in order also to melt the tube sheet in the vicinity of the melt, thereby finally producing the weld.

The method of the invention will succeed eminently if the quantity of heat required for carrying out the method is fed intermittently. This can be accomplished in simple fashion by soldering the tube sheet by means of the welding tool and the major part of the melt is guided radially to the outside. The welding tool is then removed briefly so that excessive amounts of heat in the material of the melt are carried away to the ambient air. The melt is then pushed further radially outward by the same welding tool, after which the welding tool is removed again. When the welding tool is applied for the third time, the tube sheet, for example, can already be fused together in order to complete the welding between tube end and tube sheet.

The welds made in accordance with the invention between porous tube ends and tube sheet have a strength that is greater than the strength of the tubes themselves.

Preferably, the tube end is cooled at least temporarily. By cooling the tube ends, which is advantageously carried out from the inside, the welding pauses during the discontinuous supply of heat can be reduced considerably.

In order to cool the tube end, it is often sufficient to insert a metal pin into the end of the tube, whereby the metal pin preferably comes into contact with the inner wall of the porous tube end. If such a metal pin is given a conical shape, it can be introduced with a slight pressure into the tube end located in the tube sheet, so that the metal pin, by virtue of its conical shape, causes the tube end to be braced in the tube sheet and the tube end to be reliably attached to the tube sheet in the course of carrying out the method of the invention.

Advantageously, the tube ends are inserted into the tube sheet in such a way that they project beyond the tube sheet by an amount a, whereby a corresponds from one to four times the thickness of the tube end walls. It has also been found advantageous for the molten mass of the tube ends to be guided radially outward in such a manner that the melt rests in width b on the end face of the tube sheet, b corresponding approximately to 0.5 to 2 times the thickness of the tube end walls.

Referring now to FIG. 1, tubes 1 are inserted with their tube ends 2 into tube sheet 3 and welded thereto in a manner not shown. In the following section, the method according to the invention will be described more fully with reference to detail x.

Figure 3:
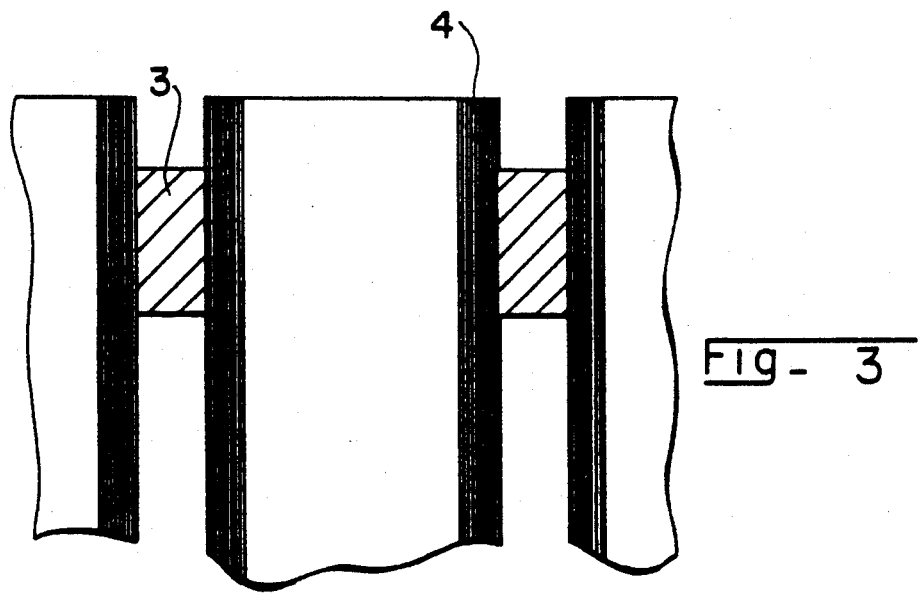
FIGS. 3 to 7 illustrate various stages of a specific embodiment of the invention.
Figure 4:
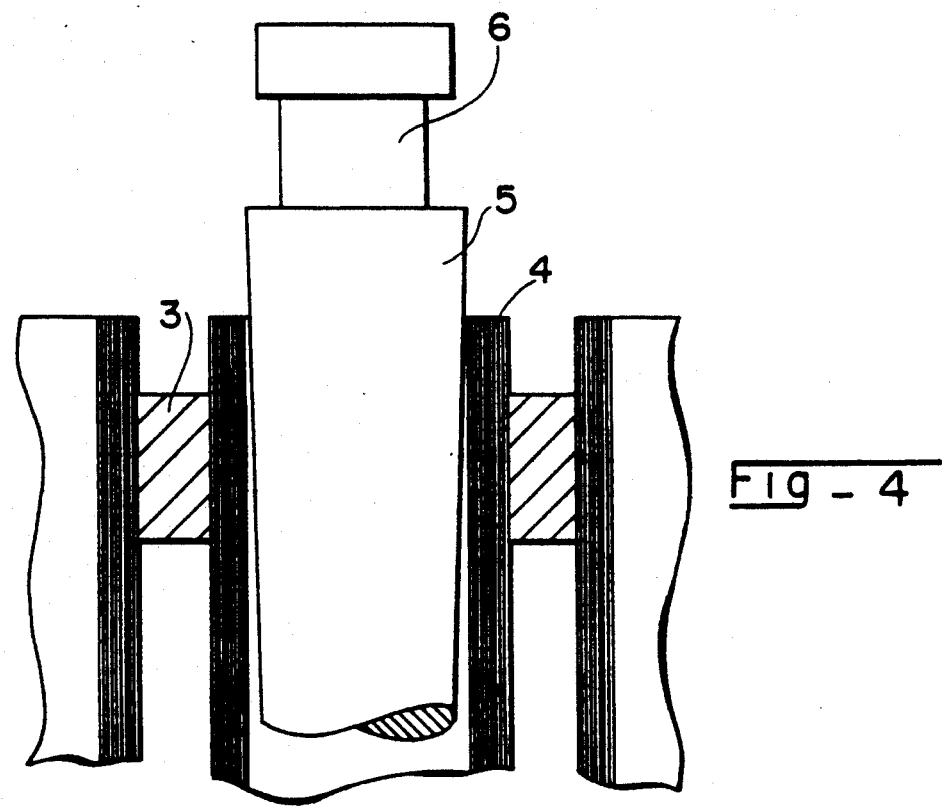

In FIG. 3, tube ends 4 project approximately two wall thicknesses beyond tube sheet 3. As illustrated in FIG. 4, a conical pin 5 may be advantageously inserted from the outside to hold tube ends 4, resulting in the tube end 4 being braced in tube sheet 3. Conical metal pin 5 is provided with a shoulder 6, which makes it easier to withdraw conical pin 5 after completion of the welding.

Figure 5:
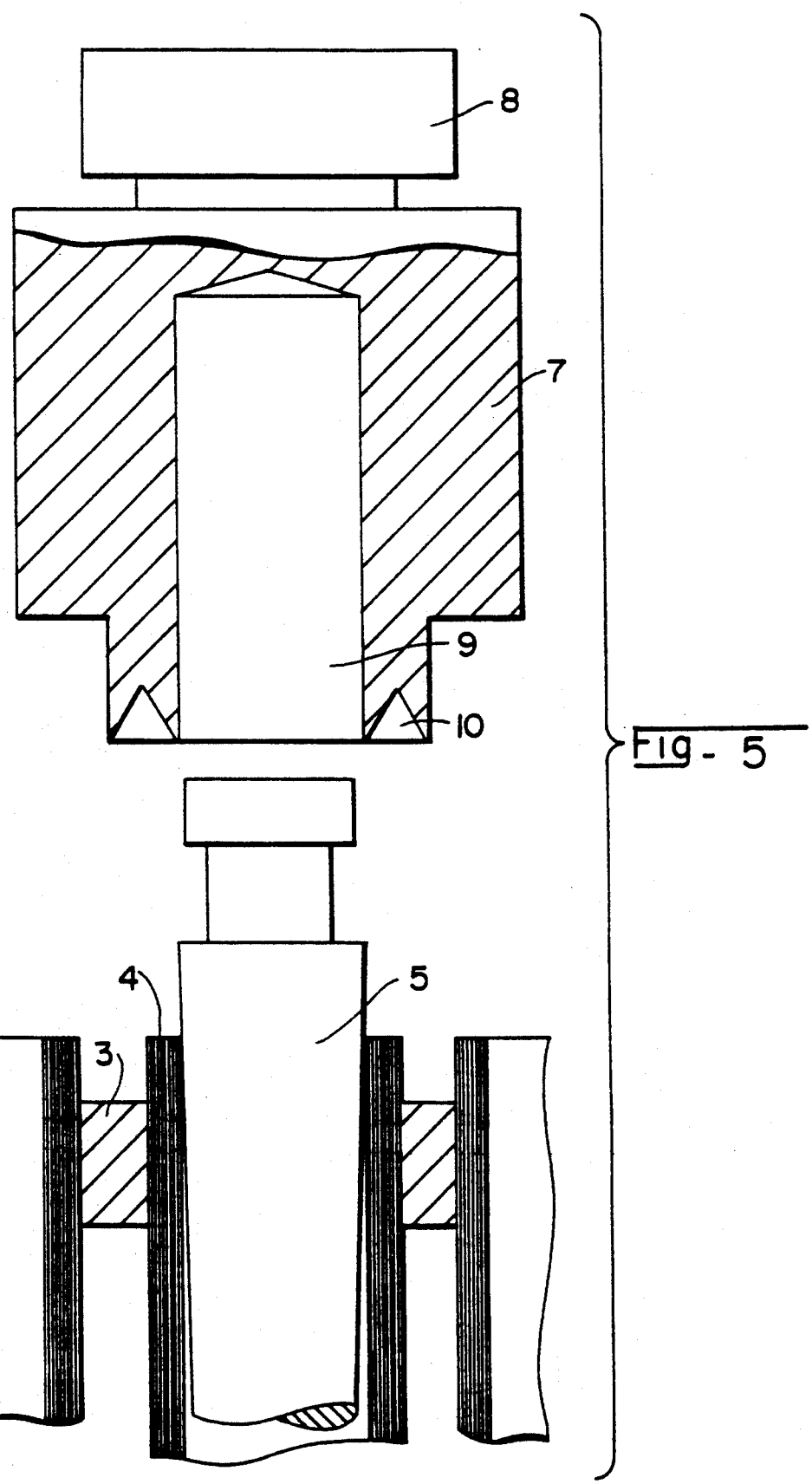
Figure 6:
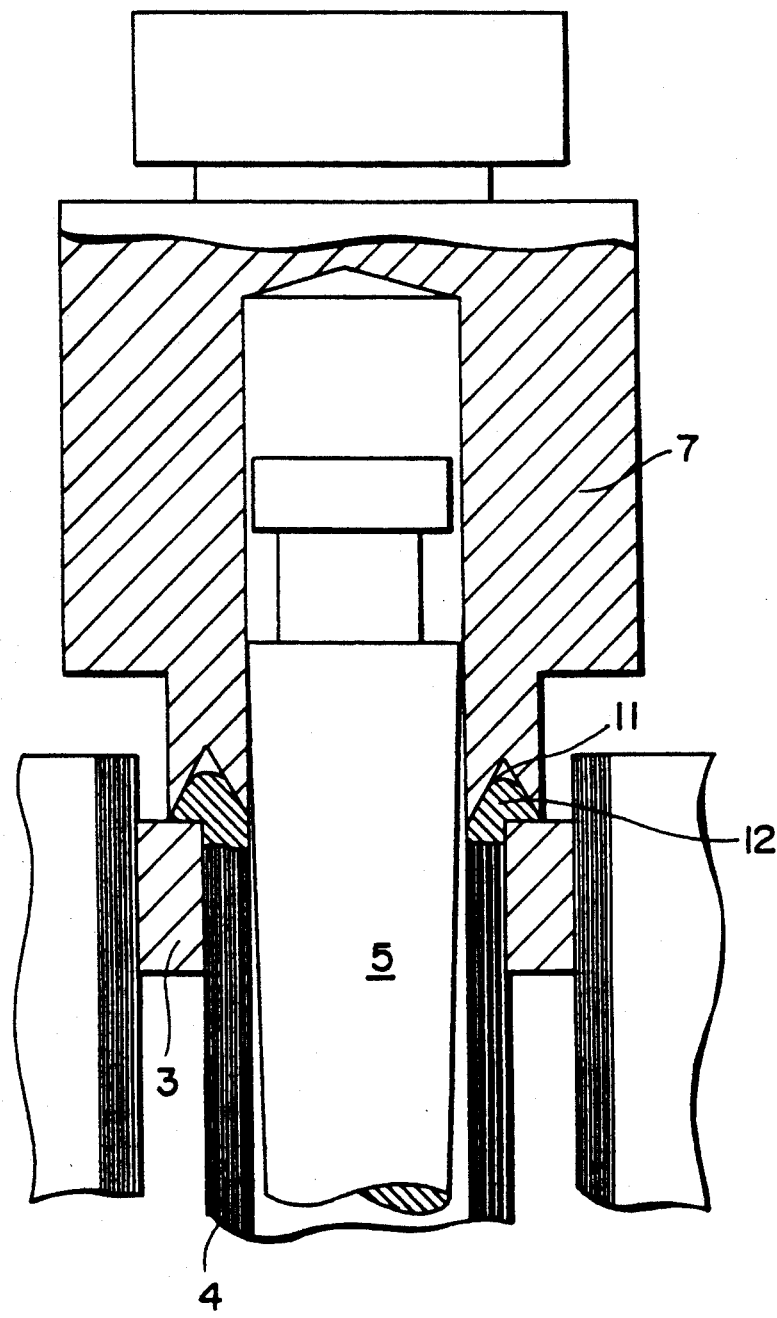
Figure 7:
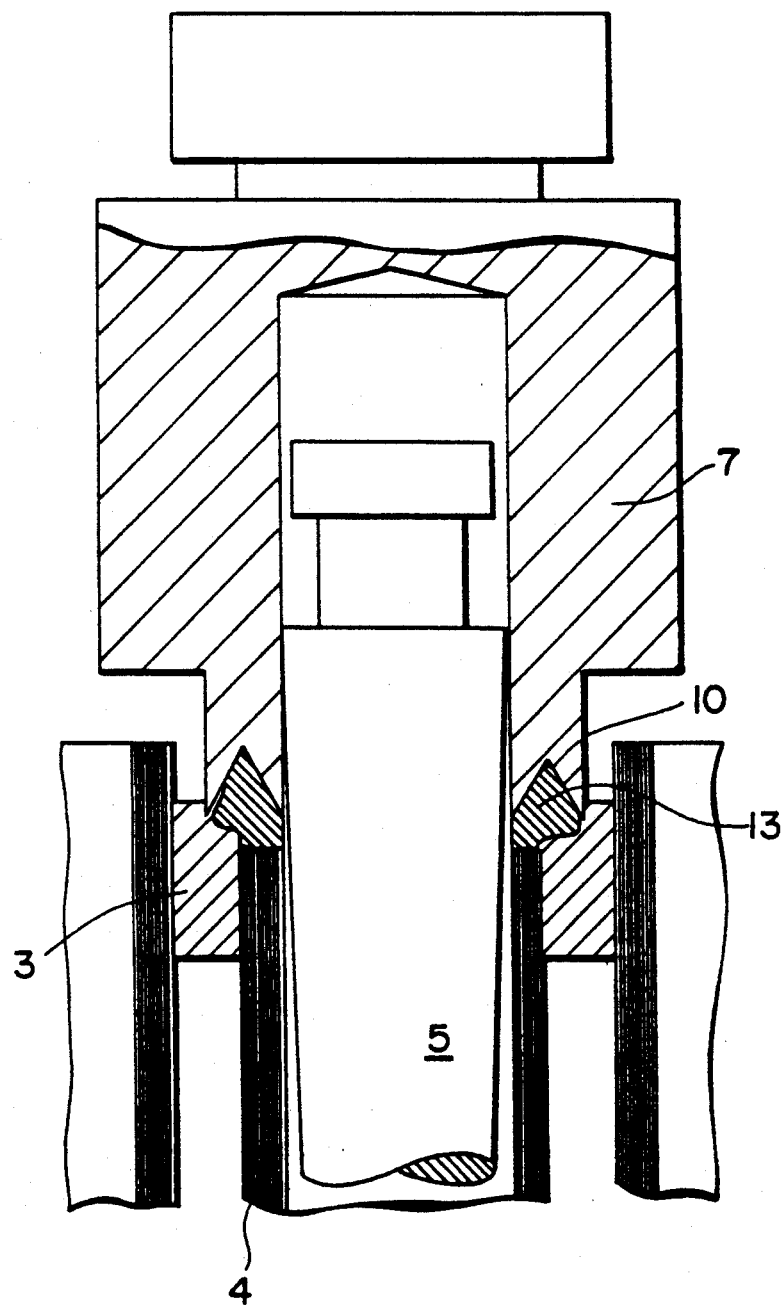

In FIG. 5, welding tool 7 is shown above the tube end 4 to be welded. Welding tool 7 can be gripped holder 8 in a heating tool not shown. Preferably, welding too is made of a metal which is a good heat conductor and which be provided with a coating that prevents adhesion at the at which it comes into contact with the material of the tube sheet 3. The welding tool 7 has a circumferential 10 on its underside, especially suitable for carrying the welding according to the invention. In FIG. 5, groove 10 is V-shaped. However, other cross-sectional may also be considered. The exact cross-sectional shape depends on the materials used for the tube ends and tube and can be optimized by simple tests. Now, tool 7 is lowered to the point to be welded, so that the tube end is first fused on the inside and pressed downwardly by the special shape of groove 10, and is then put down on the tube sheet. This condition is shown more clearly in FIG. 6, in which the fused area is designated 12. The flank of groove 10 is used to displace the melt 12. As illustrated in FIG. 7, if the welding tool is lowered further, the outer ring of groove 10 reaches tube sheet 3, which is fused as well and the molten area 13 is shaped into the welded seam itself.

Figure 8:
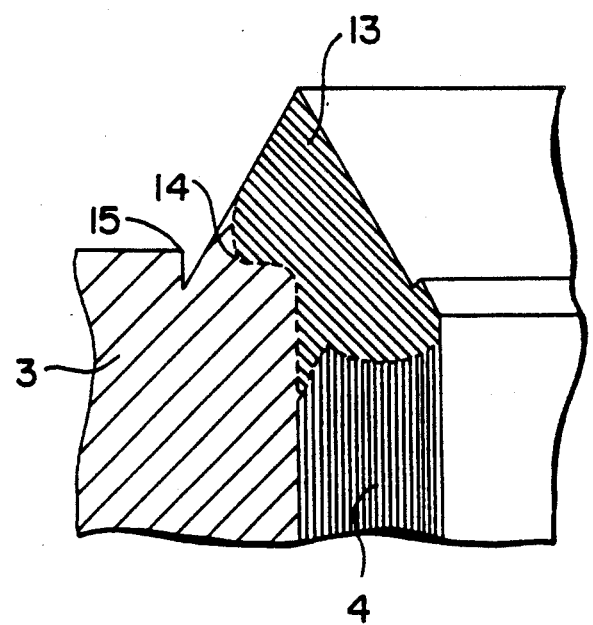
FIG. 8 is an enlarged partial schematic illustration, in cross section, of a welded seam made in accordance with the invention.

FIG. 8 shows a welded seam on a larger scale (detail y in FIG. 1). In this figure, the tube sheet is again denoted by 3 and the porous tube end by 4.

The outer surface of weld 13 has the contour of the welding tool used, while the area of fusion between the materials of tube sheet 3 and tube is located in the vicinity of dashed line 14. The application of the welding tool to the tube sheet (required for the separate heating of the tube sheet) produces a circumferential notch 15, which is typical of the process incorporating the invention, on the outer ring of welded seam 13.

The method according to the invention is suitable for producing very strong load-bearing welds between porous tubes and a tube sheet, and is preferably used for making microfilters, filters, dialyzers, blood oxygenators, and the like.

We claim:

1. A method of welding porous tube ends to a tube sheet having bores, comprising:
   inserting said tube ends, having a porosity of at least 20% of tube wall volume, into the bores of said tube sheet so that said ends extend beyond an opposite surface of said tube sheet;
   partially melting said tube ends by contact with a hot tool which does not extend into said tube ends, while said tube ends are being cooled from their interiors, so that a melt so formed is conducted radially outwardly to rest partially upon and in contact with a flat annular portion of said opposite surface of said tube sheet and so that said tube sheet partially remains in contact with unmelted portions of said tube ends; and then
   hating said flat annular portion of said opposite surface of said tube sheet, thereby welding said tube ends and said tube sheet together.

2. The method of claim 1, wherein a quantity of heat necessary to melt said tube ends is applied to said tube ends in at least two steps.

3. The method of claim 2, wherein said tube ends are cooled by cooling means between said applications of heat.

4. The method of claim 3, wherein metal cooling pins are inserted into the tube ends prior to melting said tube ends.

5. The method of claim 1, wherein the tube ends are inserted into the tube sheet in such a way that they extend beyond the opposite surface of said tube sheet by an amount corresponding from 1 to 4 times a wall thickness of the tube ends.

6. The method of claim 1, wherein the melt of the tube ends is conducted radially outwardly such that the melt lies in a width b on the opposite surface of the tube sheet, b corresponding approximately to 0.5 to 2 times a wall thickness of the tube ends.

* * * * *

UNITED STATES PATENT AND TRADEMARK OFFICE
CERTIFICATE OF CORRECTION

PATENT NO. : 4,990,206

DATED : February 5, 1991

INVENTOR(S) : Friedrich GARSKE et al

It is certified that error appears in the above-identified patent and that said Letters Patent is hereby corrected as shown below:

Col. 3, line 60, after "gripped" insert --by--;

line 61, change "too" to --tool 7--;

line 66, after "ferential" insert --groove--;

line 68, before "groove" insert --circumferential--; after "cross-sectional" insert --shapes--.

Col. 4, line 2, after "tube" (second occurrence) insert --sheet--.

Claim 1, line 16 (col. 4, line 46), change "hating" to --heating--.

Signed and Sealed this

Thirtieth Day of June, 1992

*Attest:*

DOUGLAS B. COMER

*Attesting Officer*  *Acting Commissioner of Patents and Trademarks*